(12) United States Patent
Weller

(10) Patent No.: US 7,963,527 B2
(45) Date of Patent: Jun. 21, 2011

(54) CHUCK AND METHOD FOR MANUFACTURING A CHUCK

(75) Inventor: Hans-Michael Weller, Affalterbach (DE)

(73) Assignee: Hainburch GmbH Spannende Tech (DE)

( * ) Notice: Subject to any disclaimer, the term of this patent is extended or adjusted under 35 U.S.C. 154(b) by 1013 days.

(21) Appl. No.: 11/776,269

(22) Filed: Jul. 11, 2007

(65) Prior Publication Data

US 2008/0012247 A1 Jan. 17, 2008

(30) Foreign Application Priority Data

Jul. 13, 2006 (DE) .......................... 10 2006 033 396

(51) Int. Cl.
*B23B 31/12* (2006.01)

(52) U.S. Cl. ........................................ 279/110; 279/121

(58) Field of Classification Search .................... 279/11, 279/114, 121–122, 118–119; 384/50, 53, 384/55, 56
See application file for complete search history.

(56) References Cited

U.S. PATENT DOCUMENTS

| | | | | | |
|---|---|---|---|---|---|
| 2,597,489 | A | * | 5/1952 | Huntting | 279/114 |
| 2,925,282 | A | * | 2/1960 | Borsetti | 279/123 |
| 3,542,386 | A | * | 11/1970 | Becker | 279/121 |
| 3,814,451 | A | * | 6/1974 | Rohm | 279/121 |
| 3,815,293 | A | * | 6/1974 | Karbowski | 451/393 |
| 2007/0210537 | A1 | * | 9/2007 | Weller et al. | 279/43.6 |

FOREIGN PATENT DOCUMENTS

| | | |
|---|---|---|
| CA | 2 583 383 A1 | 4/2006 |
| DE | 612 878 | 5/1935 |
| DE | 656 664 | 2/1938 |
| DE | 36 20 229 A1 | 1/1987 |
| DE | 100 45 256 C1 | 6/2002 |

* cited by examiner

*Primary Examiner* — Daniel W Howell
*Assistant Examiner* — Paul Janeski
(74) *Attorney, Agent, or Firm* — Akerman Senterfitt

(57) ABSTRACT

A chuck (10) has a chuck body (12), which is provided with three guide devices (24), on each of which is received a radially movable clamping holder (34) for fixing a workpiece to chuck body (12), the guide device (24) being constructed separately from the chuck body (12). Guide device (24) is integrally joined by a polymer concrete filling (46) to the chuck body (12) for a force transfer between guide device (24) and chuck body (12). There is no need for a particularly precise manufacture of the outer contour of guide device (24) and the recess (20) in chuck body (12), because the polymer concrete (46) is able to compensate tolerances.

15 Claims, 5 Drawing Sheets

CHUCK AND METHOD FOR MANUFACTURING A CHUCK

The following disclosure is based on German Patent Application No. 10 2006 033 396.9 filed on Jul. 13, 2006 which is herewith incorporated into this application by explicit reference.

FIELD OF APPLICATION AND PRIOR ART

The invention relates to a chuck with a chuck body provided with at least one guide device on which is received at least one movable clamping holder for fixing a workpiece to the chuck body, as well as a method for manufacturing a chuck. The clamping holder is particularly radially movable.

Chucks for use on a rotary machine spindle are known, particularly on a machine spindle of a lathe, or for fixing to a machine table, particularly to a machine table of a milling machine or a machining centre. Using the chuck a workpiece to be machined can be precisely fixed with a high repetition accuracy to the machine spindle or to the machine table. Following the fixing of the workpiece a machining process can be carried out on the workpiece. Machining forces occurring on the workpiece can be transferred via the chuck to the machine spindle or machine table. To this end the known chuck has a chuck body, which is typically provided with an interface for force-transmitting coupling to the machine spindle or machine table.

In order to fix a workpiece to the chuck, there must be at least one clamping or chucking holder movably received on the chuck body. The clamping holder can be constructed as a clamping device for direct force transfer and with contact to the workpiece to be machined or as a clamping device support for receiving such a clamping device. At least one guide device is provided for the movable reception of the clamping holder on the chuck body. In the case of the known chuck the guide device is recessed into the chuck body and permits a relative movement between clamping holder and chuck body. The relative movement has an at least proportionately radially oriented component of motion and preferably the relative movement takes place exclusively radially. The guide device also permits a transfer of clamping forces applied for fixing the workpiece to the chuck. In the known chuck the clamping holder is fitted in a radial direction in linearly movable manner with respect to the cylindrically designed chuck body.

In order to achieve an exact, repetition-accurate fixing of the workpiece to the chuck body, a precise clamping holder guidance must be ensured. Only then is it possible during each clamping process for the workpiece to be located in the same position. When using the clamping device on a machine spindle of a lathe, it is also necessary to ensure a precise alignment of the workpiece relative to a rotation axis of the machine spindle. Otherwise an undesired concentricity error occurs during a machining process on the lathe. It is consequently necessary to ensure that the clamping holder or holders are oriented and positionable in an exact manner to a reference geometry on the chuck serving as the interface. The reference geometry is provided for a precise orientation with respect to the machine spindle. In the case of chucks for lathes a considerable proportion of the manufacturing costs for the chuck are a result of the need for a precise manufacture of the clamping holder and the need for a precise manufacture of the guide devices relative to the reference geometry.

PROBLEM AND SOLUTION

The problem of the invention is to improve a chuck and a method for the manufacture of a chuck in such a way that there is a simplified manufacture with reduced manufacturing costs.

This problem is solved by a chuck having the features of claim 1 and by a chuck manufacturing method having the features of claim 20. Advantageous and preferred developments of the invention are given in the remaining claims and are explained in greater detail hereinafter. Features describing both the chuck and the manufacturing method are in part only described once hereinafter. However, independently thereof, they apply both to the chuck and the manufacturing method. By express reference the wording of the claims is made into part of the content of the description.

According to a first fundamental aspect of the invention a chuck of the aforementioned type is provided, in which the guide device is fabricated separately and as a part originally separate from the chuck body and consequently constitutes a discrete chuck component. Thus, different materials and/or manufacturing methods specifically matched to the requirements of the given components can be chosen for the chuck and for the guide device. For the guide device it is preferable to choose a high strength material, which permits a reliable transfer of high forces between workpiece and chuck body. For the chuck body use is preferably made of a lighter and possibly less expensive material than for the guide device. With a lightweight chuck body the forces which occur when using the chuck on a moving machine spindle as a result of unbalances and acceleration/deceleration processes, can be kept low. Additionally the guide device can be manufactured using manufacturing and/or surface working steps which, for technical reasons or cost reasons, cannot be used for the chuck body. The chuck body is preferably a steel or aluminium member made by turning and/or milling processes. The guide device is preferably manufactured by milling, forging, extrusion, metal casting, precision casting, grinding or a combination of such working processes. Besides steel, the guide device material can be titanium or some other high strength alloys, which could not be used for the manufacture of the entire chuck body as a result of cost. The guide device can also be given a surface coating in order to produce a particularly high load capacity surface. The coating process can for example be nitriding or chromizing, particularly coating with titanium nitride. The cross-section of the guide device and in particular the guide in the clamping holders is arbitrary and undercut cross-sections with a slope or step shape such as for example a T-shape are particularly advantageous.

According to a development of the invention, the guide device is integrally fixed to the chuck body. An integral fixing can in particular be obtained by welding, soldering, bonding, casting or by a combination of such joining processes. There can be a direct contact between the chuck body and the guide device, as is implemented when welding by fusing together the materials of the chuck body and guide device. In a welding process using filling material or during soldering, bonding or casting a filling material is introduced between the chuck body and the guide device and interconnects the two parts. The use of a filling material makes it possible to compensate shape differences between the guide device and chuck body. Such shape differences are present as shape and position tolerances for the manufacture of the guide device and chuck body and significantly influence the manufacturing costs. Moreover, as a result of the filling material, different materials, which can for example not be welded together, can be firmly interconnected through the other, aforementioned joining methods. Apart from joining the parts, the filling material can also serve as a damping layer and/or as an elastic layer, in order to damp force peaks and reduce the transfer of vibrations between the connected components.

According to a further development of the invention a gap, which is at least substantially bounded by the guide device and a recess in the chuck body, is at least partly filled with a hardenable filling material, particularly with polymer concrete. The gap is preferably dimensioned in such a way that the geometries of the chuck body and guide device bounding the gap can have rough tolerances, so that these geometries can be inexpensively manufactured. Even in the case of an unfavourable tolerance combination for the geometries, there is still an adequate volume available for the hardenable filling material. The filling material can in particular be constituted by temporarily flowable mixtures, which for example have a binder and a hardener and which harden through the activation of the binder by the hardener after a predeterminable time. In a preferred embodiment of the invention polymer concrete is used as the filling material. Polymer concrete or cast mineral is a material made from mineral fillers such as granite, basalt, chalk, quartz gravel, quartz sand or stone dust in in each case different granularities and with a small proportion of reaction resins such as epoxy resin or miscellaneous binders. The material is mixed and poured cold into a mould in the form of a homogeneous mass. Compared with other materials, such as for example plastics, polymer concrete is characterized in that it has a particularly low and therefore advantageous shrinkage behaviour during hardening. The density of polymer concrete is much lower than that of conventional materials, particularly metals, used in the manufacture of chucks. Thus, it is a nonmetallic material, whose characteristics with regards to density, elasticity and damping can be adjusted within a wide range. Like other filler materials usable for the chuck, the polymer concrete can be filled with artificial and/or natural fibres in order to bring about a better load bearing capacity, particularly with respect to tensile forces.

In a further development of the invention, the guide device and the recess in the chuck body are matched to one another in such a way that during the fixing of a workpiece the filling material is at least preponderantly subject to compressive forces or stresses. The filling material typically has a much higher compressive load bearing capacity than tensile load bearing capacity. An appropriate matching of chuck body and guide device consequently permits the complete utilization of the positive properties of the filling material.

In a further development of the invention, the recess and the guide device have matched projections, which are constructed for a transfer of compressive forces between the chuck body and guide device via the filling material. As a result of the projections on the guide device and on the chuck body it is preferably possible to form an undercut geometry. By means of the projections the forces occurring during the clamping of a workpiece are introduced at least preponderantly as compressive stresses into the filling material. Thus, the filling material is advantageously loaded and a compact design of the interface between guide device and chuck body can be implemented.

In a further development of the invention, the recess has a profiling with an at least substantially constant cross-section and one profile axis is at least substantially radially oriented. The recess for receiving the guide device is preferably made in the chuck body by a milling process. An undercut can be inexpensively produced by using a profile cutter, which for example has a T-shaped cross-section. As the profile cutter in simple manner permits the manufacture of a profile with a constant cross-section, this ensures an inexpensive production of the recess a profile axis of the profile describes the space direction in which the profile has a constant cross-section. This profile axis is preferably radially oriented, based on the substantially cylindrically shaped chuck body or based on a rotation axis of the chuck body during filling to a machine spindle. Thus, the at least one guide device during the manufacture of the chuck can be inserted for example radially inwardly into the chuck body, where it is integrally fixed through the filling material.

In a further development of the invention, the guide device and clamping holder bound at least one guide area preferably extending parallel to a radial direction and which is constructed for receiving at least one guide means. In a preferred development of the invention the guide area is oriented parallel to the radial direction of the chuck body and consequently permits a linear, radial adjustment of the clamping holder.

The guide area is advantageously provided for receiving a bearing means. The bearing means can be a slide rail fixable to the guide device or the clamping holder. The bearing means can also have bearing or rolling members, particularly bearing balls or bearing needles received so as to move in a relative manner between the guide device and clamping holder. The bearing means constitutes a low friction, force-transferring, movable connection between the clamping holder and guide device. The clamping holder is advantageously mounted by means of a rolling guide in the guide device or the guide parts of the guide device and preferably the aforementioned bearing means or rolling members of the rolling guide are cylindrical rollers, with balls or needles as alternatives. The rolling members can form a rolling guide, so that the clamping holder is exclusively movable in a longitudinal direction of the rolling guide. The guide faces for the rolling members can be inclined to a centre axis of the chuck in order to ensure a reliable retention of the clamping holder. In particularly advantageous manner such guide faces are provided on the guide parts.

In a further development of the invention, the guide device is formed from at least two and preferably at least substantially identically shaped guide parts. This permits an inexpensive, precise production of the guide device. The guide parts can be produced as sections of a profile made by rolling, extrusion or continuous casting. Finish machining of the sections can in particular take place by longitudinal grinding, so that a high surface quality can be obtained. The at least two guide parts are subsequently joined together and consequently form the guide device. In a preferred embodiment of the invention the guide parts are constructed and/or arranged homologously to a symmetry plane, particularly homologously to a radial plane of the chuck body.

In a further development of the invention, the guide parts are coupled together by joining means, at least on insertion or during casting and optionally also permanently thereafter. The joining means can in particular be constituted by screw couplings. Screw couplings ensure an easily installed, highly loadable connection of the guide parts. The guide parts can alternatively or additionally be provided with precisely implemented and positioned positioning holes, which are intended for receiving fitting pins, so as to permit a particularly exact orientation of the mutually facing guide parts. The joining means are mainly used for fixing the guide parts until the guide means can be cast in the chuck body. Following casting the joining means are used for absorbing internal stresses on the joined together guide parts, such as can arise through the introduced clamping forces. It is also possible to remove the joining means following casting.

According to a further development of the invention, the clamping holder for fixing a workpiece is coupled to an operating device constructed for introducing radially inwardly directed operating forces onto the clamping holder. The operating device makes it possible to fix the workpiece to the chuck, in that the forces necessary for fixing are preferably introduced onto the clamping holder in synchronous manner by the operating device.

In a further development of the invention, the operating device is constructed for controlling the clamping holder by means of an operating member, particularly a wedge hook gear adjustable parallel to a machine spindle axis. Thus, use can be made of the operating member normally present in the case of a machine spindle in order to apply the clamping force necessary for workpiece fixing. The operating member is moved in translatory manner along the rotation axis of the machine spindle by a working cylinder associated with the machine tool. A transformation of the translatory movement along the rotation axis into a translatory movement of the clamping holder in the radial direction and therefore orthogonal to the rotation axis can preferably be implemented with a wedge hook gear. Corresponding oblique planes of the wedge hook gear and the clamping holder are so linearly displaced against one another that there is a movement deflection by 90 ø and the clamping holders move radially.

According to another fundamental aspect of the invention, a method for manufacturing a chuck involves the steps of receiving guide parts on an orienting means, fitting and fixing the orienting means on the chuck body using at least one orientation geometry provided on the chuck body and corresponding to the orienting means, inserting the guide parts in recesses of the chuck body and integral joining of the guide parts to the chuck body.

These method steps can be performed in different orders, so that the method can be adapted to different framework conditions. In a preferred method sequence, firstly the guide devices are moved radially inwards into the radially oriented recesses of the chuck body. An axial insertion is prevented by the projections on the guide devices and on the recesses. The orienting device is then oriented relative to the chuck body and fixed. A central hole which is in any case provided on the chuck body can thereby be used as the orientation geometry. The orienting device has arms which are matched to the positions of the recesses and the design of the guide devices and to which the latter are fitted. This gives a predetermined positioning of the guide devices relative to the chuck body. According to an advantageous procedure the gaps between the guide devices and the chuck body are then filled with filling material, which is then hardened. For filling the gaps use is preferably made of a viscous or pasty filling material to prevent the filling material being undesirably dispersed in the chuck body. These are specified in an exemplified manner. After hardening the filling material the orienting device is removed and the guide devices are integrally received on the chuck body.

These and further features can be gathered from the claims, description and drawings and the individual features, both singly or in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

BRIEF DESCRIPTION OF THE DRAWINGS

Embodiments of the invention are diagrammatically represented in the drawings and are explained in greater detail hereinafter. In the drawings show.

DETAILED DESCRIPTION OF THE EMBODIMENTS

Figure 1:
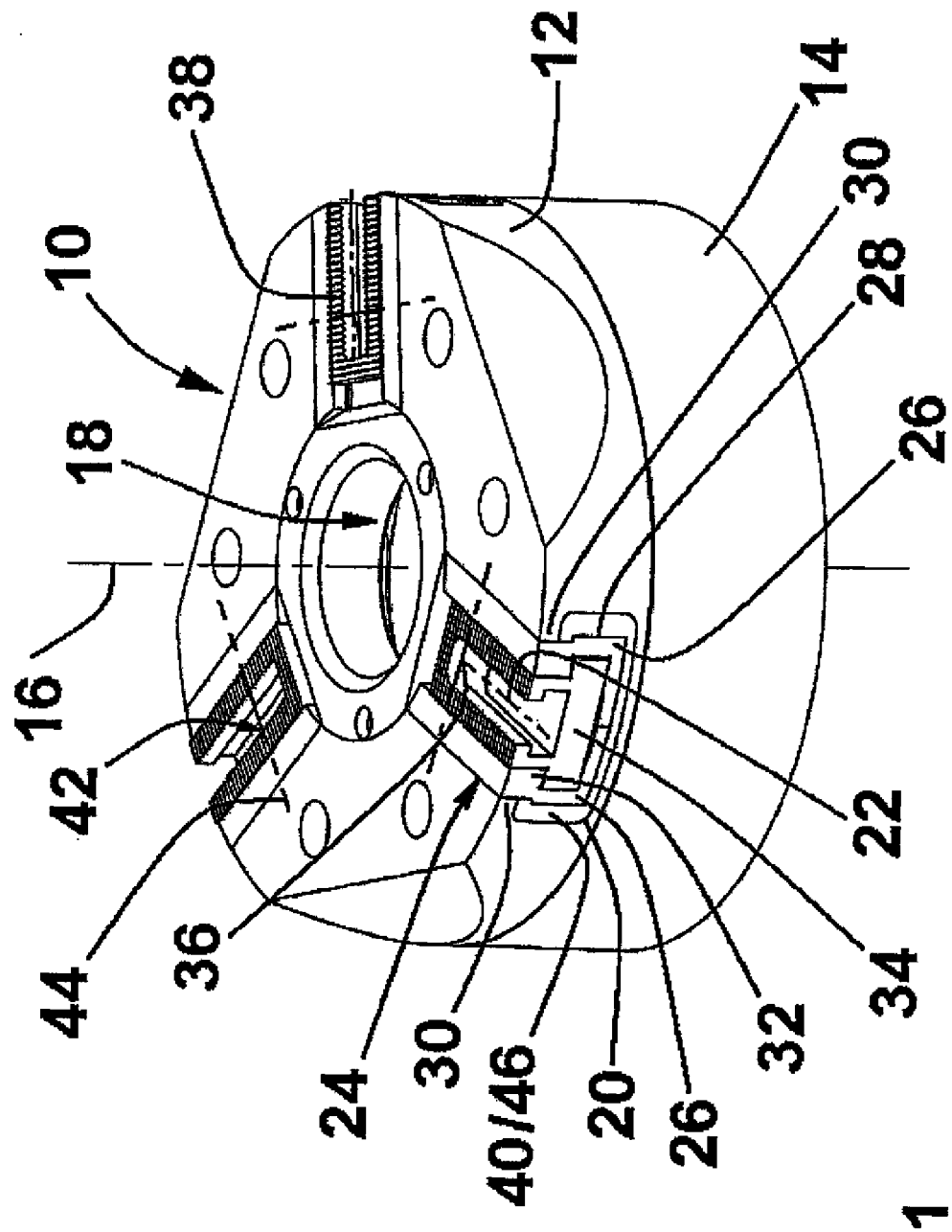
FIG. 1 A perspective view of a chuck with three guide devices having the same angular spacing.

A chuck 10 has a chuck body 12 and a coupling member 14. Both the chuck body 12 and coupling member 14 have a substantially cylindrical shape and are positioned coaxially to a common centre axis 16. The chuck body 12 and coupling member 14 are provided with central through holes 18 oriented coaxially to the centre axis 16. On a not shown, front face remote from the chuck body 12 the coupling member 14 has a coupling geometry, which can be used for a centred fitting on a not shown machine spindle of a lathe.

In the chuck body 12 there are three T-shaped profiled recesses 20 with an angular spacing of 120° based on the centre axis 16. Profile axes 22 extending in the direction of a constant profile cross-section of recesses 20, are oriented radially to chuck body 12. In each case guide devices 24 are integrally fixed in recesses 20. The guide devices 24 in each case have two substantially identically shaped guide parts 26 arranged homologously to profile axis 22 and which with respect to the latter have a constant cross-section. Polymer concrete 46 is introduced as filling material into the gap 40 between recess 20 and guide device 24.

The guide devices 24 have an outer surface and an inner surface with in each case a T-shaped cross-section. As stated hereinbefore, said cross-section need not be T-shaped. The outer surface has a cross-section adapted to recess 20 and which is sectionally wider than a minimum cross-section of recess 20. Projections 28 formed bilaterally on guide device 24 can consequently transmit compressive forces via the polymer concrete 46 to the projections 30 of recess 20. The projections 30 of recess 20 in each case form undercuts. The profiling of the inner surfaces of guide parts 26 through inwardly projecting projections 32 also forms undercuts, which are constructed for a positive, slidable reception of the clamping holder 34.

The clamping holders 34 profiled in T-shaped manner in the direction of profile axis 22 are frontally provided with a terminating surface 36, which is provided as a stop for not shown sliding blocks receivable in the T-shaped groove 42 of clamping holders 34. The sliding blocks are used for fixing not shown clamping means, which can be mounted on the top of the clamping holders 34 provided with a toothed system 38 and which are intended to provide a contact and a force transfer with a not shown workpiece. The clamping holders 34 can be subject to radially inwardly or outwardly directed clamping forces by a not shown wedge hook gear integrated into the coupling member in order to clamp the workpiece. It is generally also possible to use lever gears or key bar gears. The reaction forces on the clamping holders 34 resulting from the clamping forces lead to a tilting moment about a tilting axis 44 oriented orthogonally to centre axis 16 and to profile axis 22. In addition, the clamping holders 34 are subject to radially outwardly acting shear forces transmitted by the clamping means. The shear forces are transferred directly to the wedge hook gear and therefore play no important part with regards to the force transfer between clamping holders 34, guide device 24, polymer concrete 46 and chuck body 12. The forces transferred to clamping holders 34 by the tilting moment about tilting axis 44 must be introduced via the guide device and polymer concrete into the chuck body 12. In a radially external area of the guide device 24, the tilting moment gives rise to a compressive force 48 directed axially towards the coupling body 14. Guide device 24, via polymer concrete 46, introduces said compressive force 48 into the chuck body 12.

However, in a radially inner area of guide device 24, there is an axially directed compressive force 50 resulting from the tilting moment and which is directed away from the coupling body 14. This compressive force 50, via the projections 28 of guide parts 26 and polymer concrete 46 is transferred to the projections 30 of chuck body 12. This ensures that the polymer concrete 46 is essentially only subject to compressive forces, so that even high tilting moments can be led off into the chuck body 12.

Figure 2:
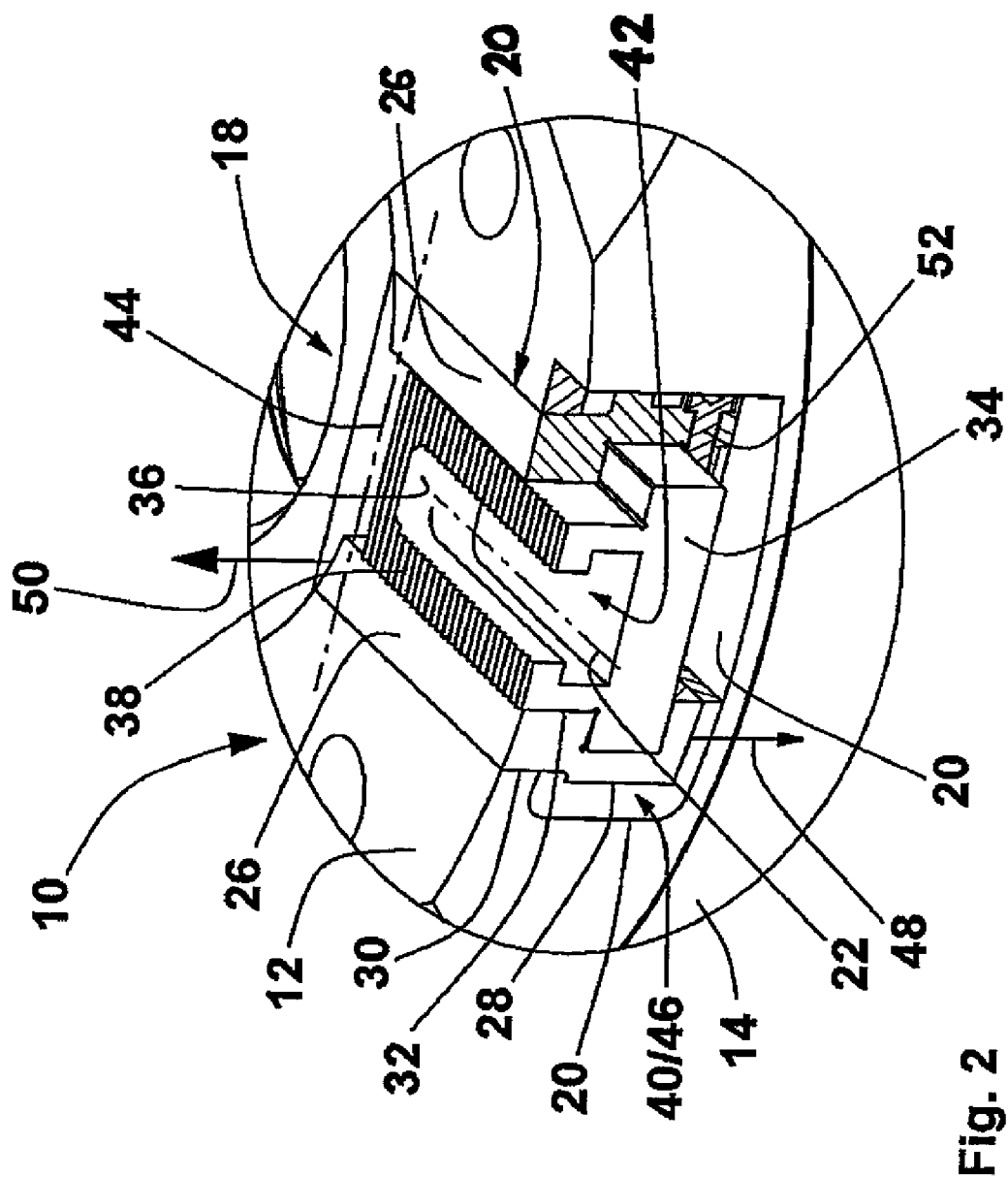
FIG. 2 A part sectional detail enlargement of the chuck of FIG. 1.
Figure 3:
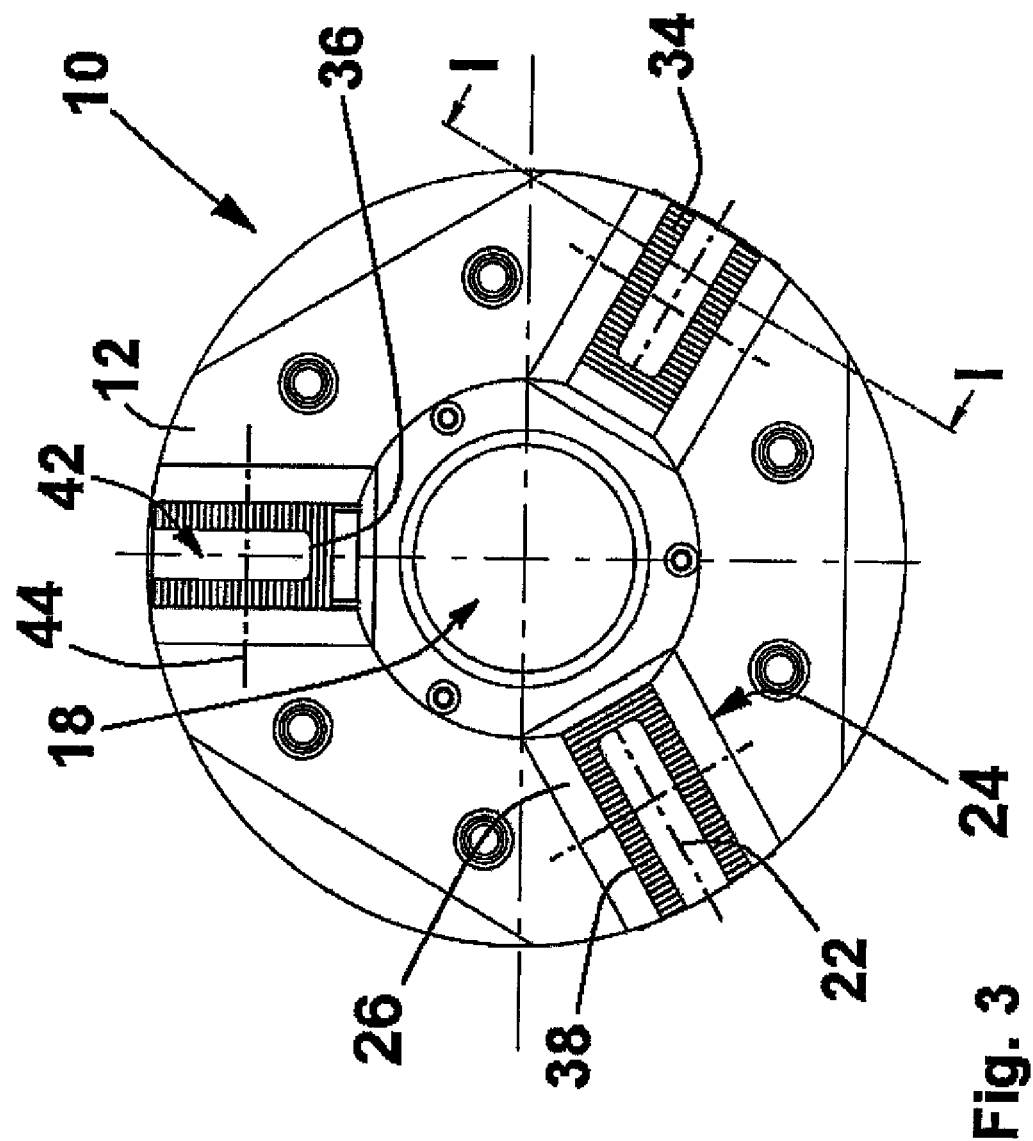
FIG. 3 A plan view of a chuck similar to FIGS. 1 and 2.
Figure 4:
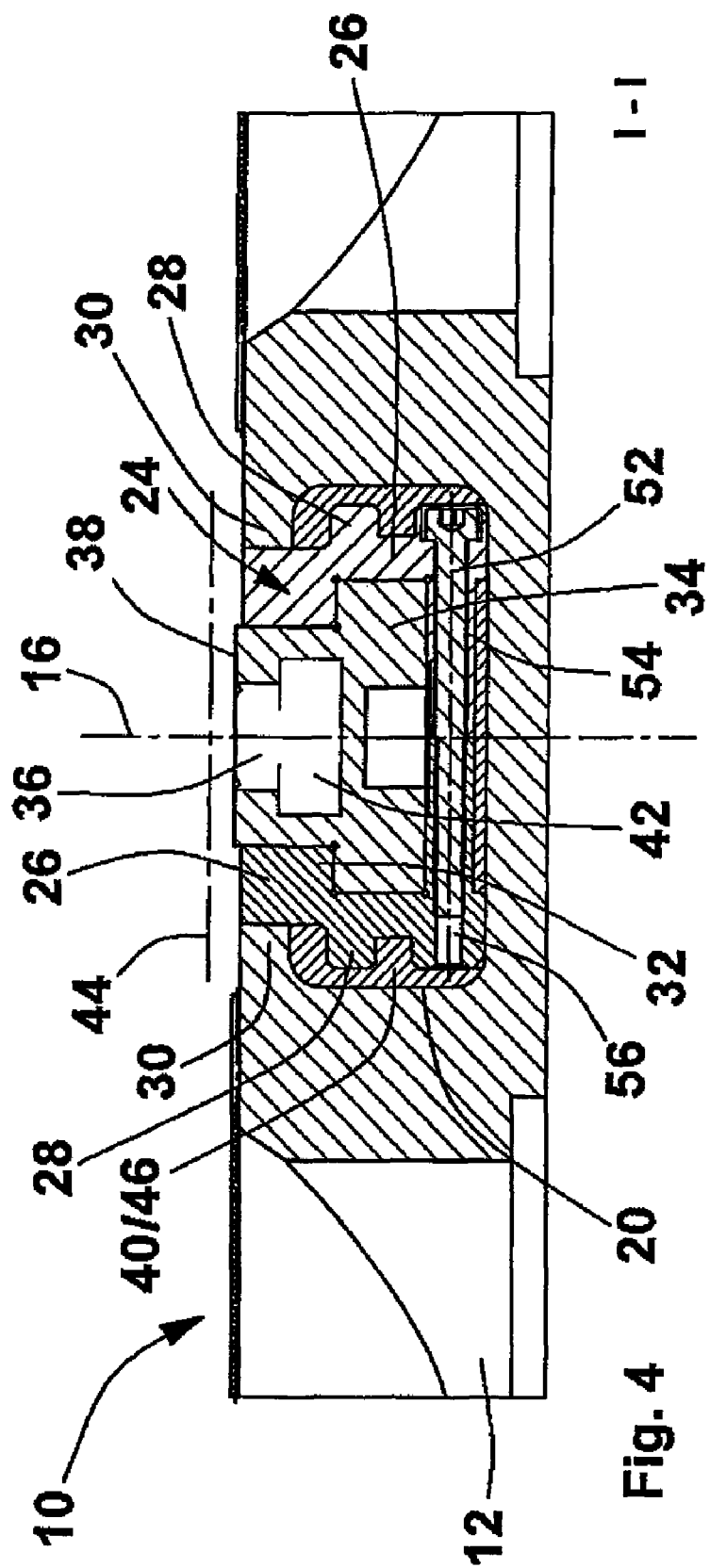
FIG. 4 A lateral sectional representation along the section path I-I in FIG. 3.

As is shown in greater detail in FIGS. 2 and 4, the guide devices 24 are constructed as a slideway for the clamping holders 34, the T-shaped grooves in the guide devices 24 being matched to the T-shaped outer contour of clamping holders 34. Thus, in this embodiment of the invention, the guide area is limited to a sliding gap necessary for the sliding movement between clamping holders 34 and guide device 24. The guide parts 26 are interconnected by joining means on the form of clamp bolts 52. The clamp bolt is passed through a through hole 54 in the first guide part 26 and engages in a tapped hole 56 in the second guide part 26. Radially inwards is provided a second, not shown clamp bolt, which engages through a through hole provided in the second guide part 26 in a tapped hole in the first guide part 26. Through such an arrangement of the clamp bolts the guide parts 26 can be in the form of identical parts arranged homologously to a symmetry plane embracing the profile axis 22 in the radial direction.

Figure 5:
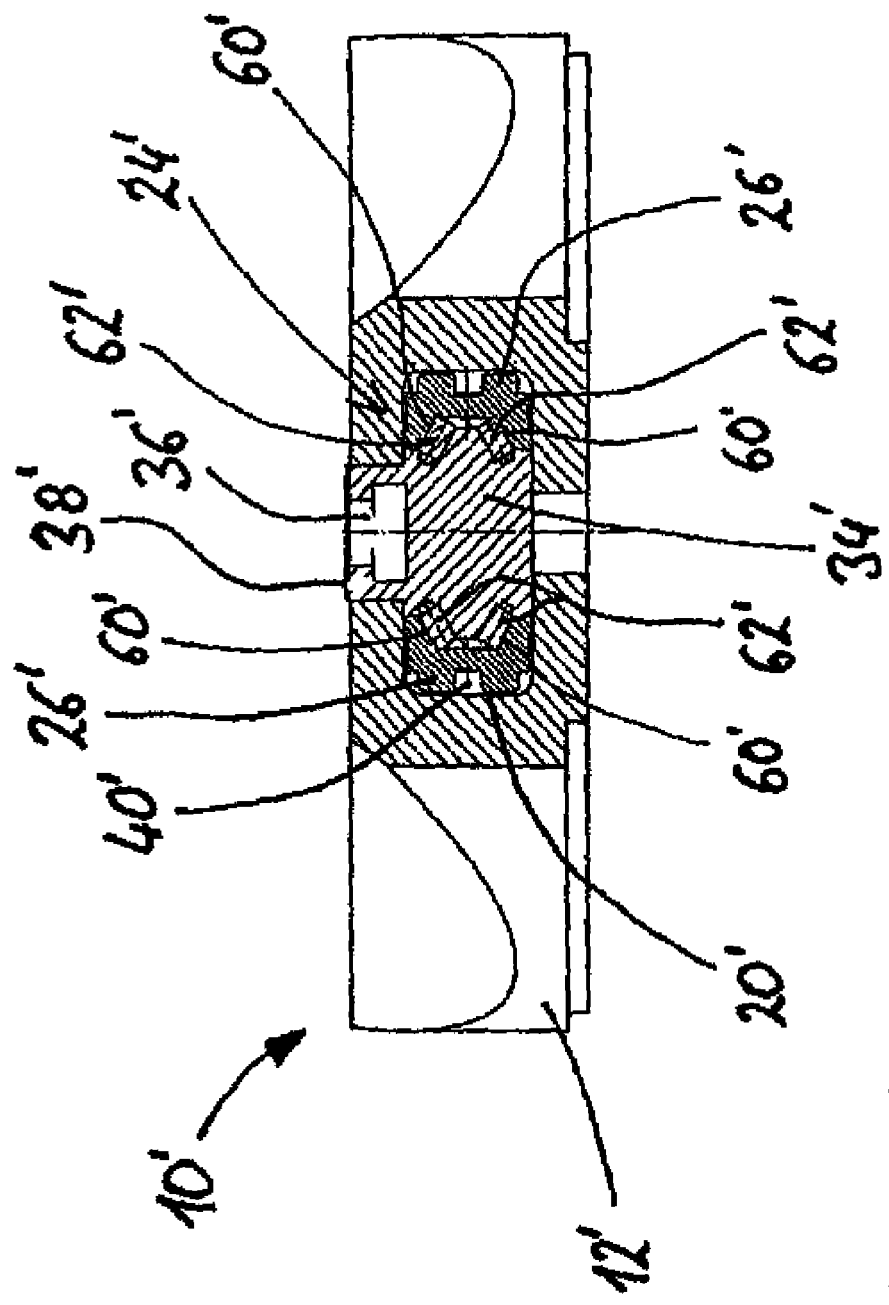
FIG. 5 A variant of a chuck in a view corresponding to FIG. 4 with a rolling guide.

FIG. 5 shows a variant of a chuck 10', where once again a guide device 24' is positioned and secured in a recess 20' of chuck body 12', particularly by introducing polymer concrete into the gap 40'. Clamping holder 34' has in the vicinity of projections 32 according to FIG. 4 cylindrical rollers 62' as rolling members and which are fixed to the clamping holder 34'. Correspondingly on the inside of guide parts 26' there are inclined faces 60' as guide faces for the rolling members 62'. Through the provision of rolling members 62' and the inclined arrangement there is an easy guidance and also an absorption of forces along the centre axis 60' and in the plane normal thereto. The advantage of the rolling guide is in particular the lower friction and a permanently wear-resistant operation. In place of the cylindrical rolling members 62' shown, it would also be possible to use other rolling members, for example balls. The advantage of fixing the rolling members 62' to the removable clamping holder 34' is easier maintenance and replaceability. The precise nature of fixing and arranging the rolling members 62' gives rise to no problem for the expert and for this purpose he can make use of known prior art solutions. Besides such a lateral rolling guide it would also be possible to have a rolling guide on the underside of the clamping holder 34'.

The invention claimed is:

1. A chuck with a chuck body, said chuck body being provided with at least two guide devices, each guide device being fabricated as a separate part from said chuck body, wherein said chuck body has at least two recesses for receiving said guide devices, wherein each said guide device as well as each said recess extends longitudinally in a radial direction of the chuck body, each recess being at least partly filled with a hardenable filling material to fix each guide device in the chuck body, wherein at least one movable clamping holder is received on each said guide device for fixing a workpiece to said chuck body, wherein the moveable clamping holder has a movement direction in the radial direction of the chuck body, wherein the recess and the filling material for one guide device are separate from the recess and the filling material for the at least one other guide device.

2. The chuck according to claim 1, wherein said clamping holder is mounted by means of a rolling guide in said guide device.

3. The chuck according to claim 1, wherein said guide device is fixed integrally to said chuck body.

4. The chuck according to claim 2, wherein in said rolling guide cylindrical rollers are provided as rolling members.

5. The chuck according to claim 1, wherein said filling material is one of polymer concrete or cast mineral.

6. The chuck according to claim 4, wherein said rolling members form a rolling guide in such a way that said clamping holder is exclusively movable along a longitudinal direction of said rolling guide.

7. The chuck according to claim 4, wherein said guide faces are provided on said guide devices for said rolling members and said guide faces are inclined to a centre axis of said chuck and are provided on said guide parts.

8. The chuck according to claim 1, wherein said recesses have a profiling, said profiling having a longitudinal cross-section that is at least substantially constant.

9. The chuck according to claim 8, wherein said profiling is undercut and a profiling axis is oriented at least substantially in radial direction of said chuck.

10. The chuck according to claim 1, wherein at least one of said guide device and said clamping holder bound at least one guide area of said chuck.

11. The chuck according to claim 10, wherein said guide area extends parallel to a radial direction and is constructed for receiving at least one guide means.

12. The chuck according to claim 1, wherein said guide device is formed from at least two substantially identically shaped guide parts, said guide parts being coupled together by joining means.

13. The chuck according to claim 12, wherein said guide parts are constructed or arranged in homologous manner to a plane of symmetry and homologously to a radial plane of chuck body.

14. The chuck according to claim 1, wherein said clamping holder for fixing said workpiece is coupled to an operating device, said operating device being constructed for introducing radially inwardly directed operating forces onto said clamping holder.

15. The chuck according to claim 14, wherein said operating device is constructed for controlling said clamping holder by means of an operating member adjustable parallel to a machine spindle axis.

* * * * *